United States Patent
Coleby

[15] 3,649,209
[45] Mar. 14, 1972

[54] TREATMENT OF SOLIDS WITH LIQUIDS

[72] Inventor: John Coleby, Buckley, Wales, England
[73] Assignee: R. Graesser Limited, Chester, England
[22] Filed: Mar. 14, 1969
[21] Appl. No.: 807,376

[52] U.S. Cl............................23/270, 23/310, 23/269
[51] Int. Cl.............................................B01d 11/02
[58] Field of Search............23/309, 310, 267, 269, 272.6, 23/270, 270.5

[56] References Cited

UNITED STATES PATENTS

| 92,455 | 7/1869 | Johnson | 23/269 |
| 485,660 | 11/1892 | Rose | 23/269 X |
| 1,312,488 | 8/1919 | Leaver | 23/269 |
| 1,447,637 | 3/1923 | Baker | 23/269 |
| 2,765,298 | 10/1956 | Signer | 23/270.5 |
| 3,017,253 | 1/1962 | Coleby | 23/310 X |
| 3,297,410 | 1/1967 | Lisle | 23/269 |

FOREIGN PATENTS OR APPLICATIONS

| 39,051 | 1936 | Netherlands | 23/270 |
| 40,047 | 1931 | France | 23/269 |
| 108,361 | 1958 | Pakistan | 23/269 |
| 253,222 | 1960 | Australia | 23/269 |
| 261,210 | 1913 | Germany | 23/269 |

Primary Examiner—Norman Yudkoff
Assistant Examiner—S. J. Emery
Attorney—Holman & Stern

[57] ABSTRACT

A method for the treatment of a granular, crystalline or powdered solid with a liquid comprising the steps of introducing a phase including the solid and a phase including the liquid into a closed, fixed container, passing the phases through mixing zones in the container with one phase lying on the other phase, displacing, in the mixing zones, portions of each phase into the other phase by means of receptacles rotating in said container, and removing the phases from the container.

4 Claims, 4 Drawing Figures

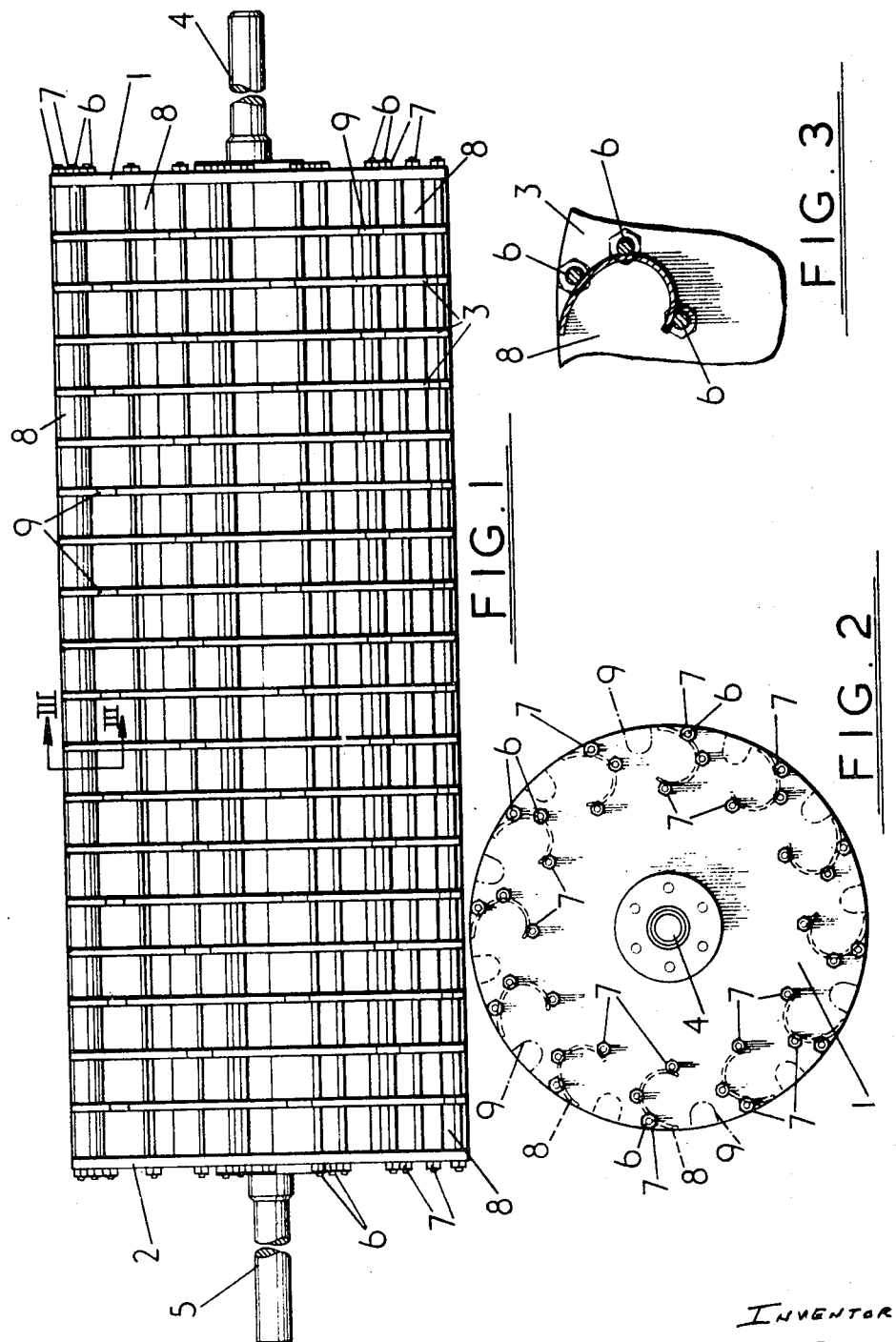

TREATMENT OF SOLIDS WITH LIQUIDS

This invention relates to the treatment of solids in powder, crystalline or granular form with liquids, for purposes such as diffusional extraction, washing extraction, chemical extraction, leaching and chemical reaction.

According to one aspect of the present invention there is provided a method for treatment of a granular, crystalline or powdered solid with a liquid comprising the steps of introducing a phase including the solid and a phase including the liquid into a closed, fixed container, passing the phases through mixing zones in the container with one phase lying on the other phase, displacing in the mixing zones portions of each phase into the other phase by means of receptacles rotating in said container and removing the phases from the container.

According to another aspect of the present invention there is provided apparatus for carrying out the method defined above comprising a container, a rotor in the container, and an inlet and an outlet in the container for each phase, the rotor having a plurality of longitudinally spaced, apertured discs and a plurality of substantially involute0shaped receptacles between the discs, the apertures in each disc being staggered relative to the apertures in adjacent discs.

An embodiment of the present invention will now be described by way of example, with reference to the accompanying drawings, in which:

FIG. 1 is a side elevation of a rotor for an apparatus according to the present invention for the treatment of solids.

FIG. 2 is an end view of the rotor of FIG. 1.

FIG. 3 is a sectional view of the rotor on the line III—III of FIG. 1, and

Figure 4:
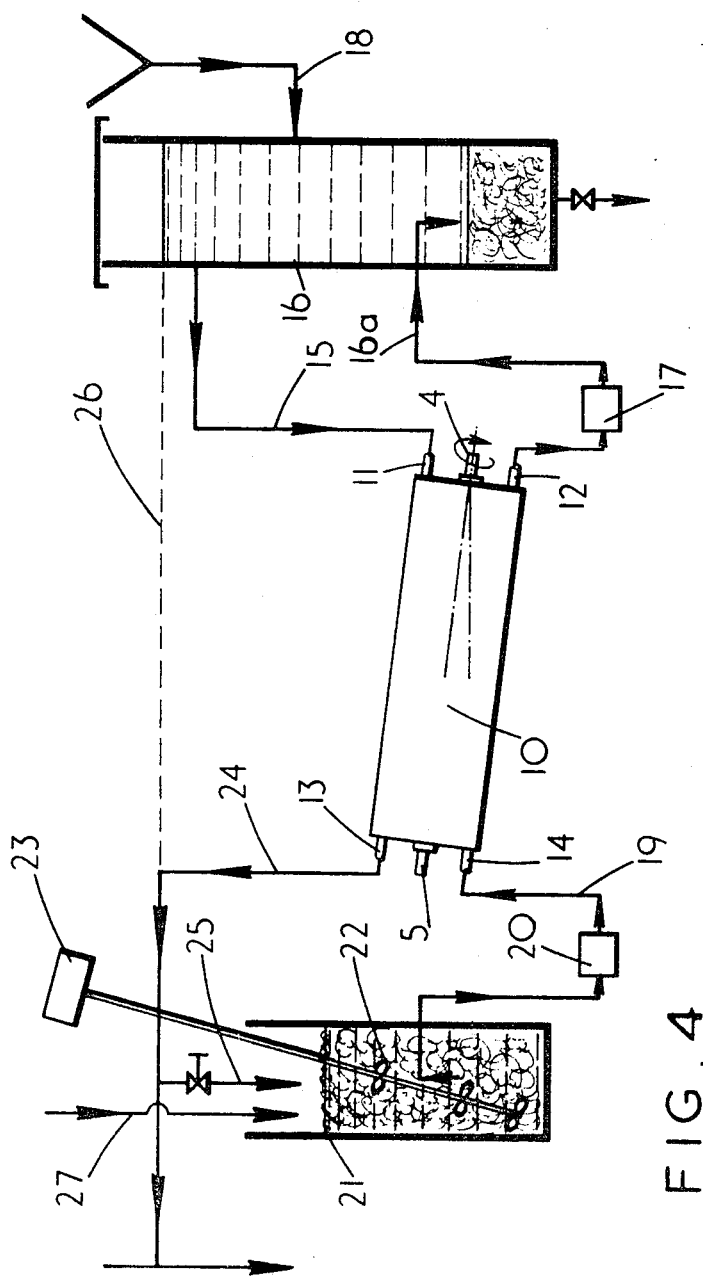
FIG. 4 is a flow diagram incorporating an apparatus according to the present invention in which is mounted the rotor of FIGS. 1 to 3, said flow diagram being designed for the washing of a ground vegetable product with methanol.

The rotor comprises end plates 1, 2 and a number of intermediate discs 3. The end plates 1, 2 are fitted with stub axles 4, 5. The discs 3 are carried by rods 6 extending between the end plates 1, 2 and secured by nuts 7. The rods 6 are arranged in groups of three, so as to be able to support liquid receptacles 8 each consisting of a sheet metal strip bent into a substantially involute shape in cross section (see particularly FIG. 3), two of the rods 6 being near the ends of the strip and the other about halfway round its periphery. The outermost end of each receptacle 8 terminates at a point closely adjacent the periphery of adjacent discs 3.

Each disc 3 is provided with a series of U-shaped apertures 9 around its periphery (see FIG. 2), the apertures 9 connecting alternate spaces between the receptacle on either side of the disc 3. The apertures 9 in adjacent discs 3 are in staggered relationship. (The apertures shown in chain-dot line in FIG. 2 are formed in discs alternating with discs provided with apertures shown in simple dotted line in FIG. 2.)

Referring now to FIG. 4, the rotor shown in FIGS. 1 to 3 is mounted to rotate within a closed, fixed, cylindrical container 10 inclined at an angle of 7° to the horizontal. The rotor within the container 10 is rotated via one of the stub axles 4, 5 by any means known per se.

At the lower end of the container 10 there is provided an upper inlet 11 and a lower outlet 12, and at the upper end of the container there is provided an upper outlet 13 and a lower inlet 14.

The upper inlet 11 is connected via a pipeline 15 to the upper part of the receiver 16 while the lower outlet 12 is connected via a pipeline 16a and a peristaltic pump 17 to the lower part of the receiver. Methanol is supplied to the receiver via a pipeline 18.

At the other end of the container 10, the lower inlet 14 is connected via a pipeline 19 and peristaltic pump 20 to an agitating vessel 21 provided with a stirrer 22 powered by a motor 23. The upper outlet 13 is connected to a pipeline 24 for extract and excess liquor return and a valve-controlled line 25 serves to provide a metered flow of liquor to the agitating vessel 21. The dotted line 26 indicates the liquid datum level it therefore being clear that the container 10, which is shown below the liquid datum level, is completely full.

In operation, solids, in this case ground vegetable product, are fed via pipe 27 into the agitating vessel 21 where they are mixed with liquor and are pumped continuously by pump 20 into the container 10. At the same time, methanol is passed continuously from the pipeline 18 into the receiver 16 and into the container 10 by way of pipeline 15 and upper inlet 11.

In the container 10, the liquid phase consisting of the methanol wash lies on the solids phase and rotation of the rotor causes the receptacles 8 to rotate and to displace portions of each phase into the other phase. The phase interface is preferably maintained at or near the center of the container. The shape of the receptacles 8 (see FIG. 3) is such that there is a minimal clearance between the inside wall of the container and the outer end of the receptacles 8 so that an extremely efficient pickup of the solids is obtained, thereby ensuring an efficient contact between the phases and an efficient extraction. The phases pass in countercurrent fashion through the container 10 by way of the staggered apertures 9 in the discs 3.

Washed solids are removed from the container 10 through the lower outlet 12 and are pumped into the receiver 16 to collect in the bottom thereof under a layer of methanol.

The extract and excess methanol passes out of the container 10 through the upper inlet 13 and part of the liquor is passed into the agitating vessel 21 via the valve-controlled line 25 to maintain the level of liquor in the vessel 21.

The receptacles 8 may be spot-welded to the discs 3. They may be welded to one side of a disc so that the rotor may be dismantled leaving each disc with a set of receptacles attached. A permanent structure may be made by welding the receptacles to the discs at each side. In this case, the rods 6 can, if desired, be omitted.

The solid material may be introduced as such or in the form of a slurry as described, and the liquid and solid flows may be in cocurrent instead of in countercurrent.

For cocurrent flow, the speed of rotation of the rotor may be arranged to be sufficient to keep the solid in suspension throughout the whole of the liquid phase. For countercurrent flow the speed of rotation is adjusted so that the underflow suspension preferably occupies the lower half of the compartment, the upper half being clear liquid. The end settling compartments may be kept mildly agitated by an attachment to the rotor, which can be tie rods extended to almost reach the end plate of the container.

If the solid phase is such that it floats then the apparatus may still be used with the roles of underflow and overflow reversed.

It will be appreciated that the present invention is applicable to the treatment of solids other than ground vegetable products, and may be applied to any solids in powered, granular or crystalline form, for example crushed mineral ores.

I claim:

1. Apparatus for countercurrent contacting of a slurry of granular solids with a liquid comprising a horizontally inclined closed stationary cylindrical vessel, a rotor disposed for axial rotation in and extending substantially the length of said vessel, said rotor comprising a pair of circular end plates having axles axially mounted thereon for rotation of said rotor, a plurality of rods attached to and extending between said end plates, a plurality of evenly axially spaced circular imperforate discs mounted on said rods, said discs being mounted perpendicularly to the axis of said vessel and having substantially the same size as the inside cross-sectional area of said vessel, each of said discs having a plurality of U-shaped apertures around its periphery, the apertures in each disc being staggered relative to the apertures in adjacent discs, a plurality of involute scoop-shaped receptacle means extending between adjacent discs, said receptacle means being disposed about the periphery of said discs and facing in the same direction relative to the direction of rotation of said rotor, slurry inlet means and liquid outlet means in the uppermost end of said vessel, and liquid inlet means and slurry outlet means in the lowermost end of said vessel.

2. Apparatus as claimed in claim 1, wherein the apertures in each disc join the spaces between alternate receptacles on either side of that disc.

3. Apparatus as claimed in claim 1, wherein means are provided for mixing the solids with part of the liquid phase from the container to produce a solids phase in the form of a slurry.

4. Apparatus as claimed in claim 1, wherein the inclination is 7°.

* * * * *